United States Patent
Xu

(10) Patent No.: US 9,249,303 B2
(45) Date of Patent: Feb. 2, 2016

(54) THERMOPLASTIC ELASTOMER COMPOUNDS EXHIBITING HIGH LATENT HEAT OF FUSION IN SOLID STATE

(75) Inventor: Liang Xu, Buffalo Grove, IL (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/352,715

(22) PCT Filed: Sep. 12, 2012

(86) PCT No.: PCT/US2012/054707
§ 371 (c)(1),
(2), (4) Date: Apr. 18, 2014

(87) PCT Pub. No.: WO2013/058892
PCT Pub. Date: Apr. 25, 2013

(65) Prior Publication Data
US 2014/0243471 A1    Aug. 28, 2014

Related U.S. Application Data

(60) Provisional application No. 61/549,817, filed on Oct. 21, 2011.

(51) Int. Cl.
| | | |
|---|---|---|
| *C08L 91/08* | (2006.01) |
| *C08L 25/02* | (2006.01) |
| *C08L 91/06* | (2006.01) |
| *C08L 25/08* | (2006.01) |
| *C08L 53/00* | (2006.01) |
| *C08K 5/01* | (2006.01) |

(52) U.S. Cl.
CPC . *C08L 91/06* (2013.01); *C08K 5/01* (2013.01); *C08L 25/08* (2013.01); *C08L 53/00* (2013.01); *C08L 2205/03* (2013.01); *C08L 2205/035* (2013.01)

(58) Field of Classification Search
USPC .......................................................... 524/487
See application file for complete search history.

(56) References Cited

U.S. PATENT DOCUMENTS

| | | |
|---|---|---|
| 5,565,132 A | 10/1996 | Salyer |
| 6,703,127 B2 | 3/2004 | Davis et al. |
| 6,835,334 B2 | 12/2004 | Davis et al. |
| 2002/0016505 A1 | 2/2002 | Gally et al. |
| 2002/0049276 A1 | 4/2002 | Zwick |
| 2003/0220432 A1 * | 11/2003 | Miller et al. ................... 524/439 |
| 2004/0175343 A1 * | 9/2004 | Osborne et al. ............. 424/70.11 |
| 2011/0028623 A1 * | 2/2011 | Qian et al. .................... 524/261 |

FOREIGN PATENT DOCUMENTS

| | | |
|---|---|---|
| WO | 2008045702 | 4/2008 |
| WO | 2009029634 | 3/2009 |

OTHER PUBLICATIONS

Sasol North America, Linear Paraffins C14-C16 Technical Brochure, 2009.
Sasol Olefins & Surfactants GmbH, Parafol Single Cut Paraffins Technical Brochure.
Sasol Wax North America Corp., Sasolwax R4250 Product Data Sheet, 2008.

\* cited by examiner

*Primary Examiner* — Hui Chin
(74) *Attorney, Agent, or Firm* — Michael J. Sambrook; John H. Hornickel

(57) ABSTRACT

A thermoplastic elastomer compound is disclosed having a high latent heat of fusion, indicative of a large thermal capacity. Use of thermal capacity agents, particularly linear paraffin waxes used in replacement of conventional plasticizer oils, contributes the thermal capacity advantages. Selection of the particular thermal capacity agent can provide an ability to engineer the amount of thermal capacity and the transition temperature in which that thermal capacity can be utilized as absorption or release of heat. The compound experiences a solid-solid phase transition whenever the thermal capacity agent melts into liquid form in the compound.

10 Claims, No Drawings

THERMOPLASTIC ELASTOMER COMPOUNDS EXHIBITING HIGH LATENT HEAT OF FUSION IN SOLID STATE

CLAIM OF PRIORITY

This application claims priority from U.S. Provisional Patent Application Ser. No. 61/549,817 filed on Oct. 21, 2011, which is incorporated by reference.

FIELD OF THE INVENTION

This invention relates to thermoplastic elastomers having a good latent heat of fusion, which indicates a good thermal capacity useful in a large number of products applying principles of thermodynamics.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers. Therefore, TPEs are preferred because they can be made into articles using injection molding equipment.

Thermal capacity, also known as heat capacity, can be expressed with respect to an object as the ratio between the amount of heat energy transferred to the object and the resulting increase in temperature of the object.

Every substance has a thermal capacity. Metals generally have very little thermal capacity and dissipate heat almost as quickly as the metallic object is heated. Water generally has a large thermal capacity and retains heat for a considerable period of time, dissipating heat only very slowly.

These thermodynamic principles have practical effects and advantages in materials science. Polymeric materials with a good thermal capacity can serve as heat absorbers or heat dissipators depending on the relative temperatures at the interfaces between those polymeric materials and their contiguous materials. A heating pad can soothe tired and sore back muscles after considerable exertion. An ice pack can reduce swelling at a twisted ankle. Either way in these examples, the capacity to obtain and retain heat or cold allows materials to give therapeutic relief.

SUMMARY OF THE INVENTION

What the art needs is a new formulation of thermoplastic elastomer compounds that have a high latent heat of fusion. "Latent heat" is often expressed as the heat released or absorbed by a chemical substance or a thermodynamic system during a process that occurs without a change in temperature. "Latent heat of fusion" is often expressed as the enthalpy change of any amount of substance when it melts from solid to liquid. The enthalpy or total energy of a thermodynamic system changes without a change in temperature.

Water is a convenient example. The liquid phase of $H_2O$ has a higher internal energy than the solid phase, ice. Energy must be supplied to ice in order to melt it to form liquid water. Conversely, energy is released from liquid water when it freezes to solid ice, because the molecules in the liquid experience weaker intermolecular forces and have a larger potential energy.

Water has a latent heat of fusion of about 334 Joules/gram (J/g), very large compared to about 109 J/g for ethanol. Paraffin wax has a latent heat of fusion of about 200-220 J/g.

When liquid water is cooled, its temperature falls steadily until it drops just below the freezing point at 0° C. The temperature then remains constant at the freezing point while the water crystallizes. Once the water is completely frozen, only then does its temperature continue to fall. That period of time when the temperature does not change while the amount of heat is released during crystallization is key to an understanding of this invention, because during that period of time, the latent heat of fusion demonstrates itself best. Those materials, such as water, which are superior in thermal capacity to other materials, such as ethanol, have a larger capacity for storage and release of heat during melting and crystallization, respectively.

U.S. Pat. No. 6,703,127 (Davis et al.) has proposed using macrocapsules for containing what they call "phase change materials." This approach not only is expensive but also complicates the shaping of thermoplastic compounds into useful articles via molding or extruding because of the difficulty of achieving sufficient loading of such macrocapsules in the mixture of ingredients comprising the thermoplastic compound.

What the art also needs is a combination of ingredients which mix well and remain mixed well during processing and performance.

The present invention has identified TPE compounds which have excellent latent heats of fusion, an indication of very good thermal capacity, and which can be tailored based on a choice of thermal capacity agents to provide those very good thermal capacities over a range of transition temperatures useful between about −10° C. and about 70° C.

Using Differential Scanning calorimetry (DSC), TPE compounds of the present invention have been found to provide enthalpies of melting ranging from about 10 to about 120 J/g and enthalpies of crystallization ranging from about 10 to about 125 J/g. Therefore, not only can the TPE compounds be tailored to select a transition temperature of between about −10° C. and about 70° C. as the useful temperature for heat absorption or heat release, but also the amount of heat to be absorbed or released at that temperature can be tailored from a small amount to a very large amount.

It has been found that the enthalpy values are proportional to the amount of thermal capacity agents present in the TPE compound. Unexpectedly, those thermal capacity agents, even with high loadings of such agents in the TPE compound, remain well dispersed and not disrupting of the physical properties needed by the TPE compound for processing and performance. In other words, with a less complicated recipe than macrocapsules dispersed in a TPE, the concept of the present invention can be used to establish a quantum of thermal capacity and a transition temperature where that quantum of thermal capacity can be used to best advantage in a TPE compound which has all of the benefits of processing and performance which have made TPE compounds preferred materials for use in a wide variety of industrial, consumer, and other performance solutions to material science problems.

One aspect of the present invention is a thermoplastic elastomer compound comprising at least one thermoplastic elastomer and at least one thermal capacity agent directly dispersed in the compound of from about 5 to about 70 weight percent of the compound, wherein the compound experiences a solid-solid phase transition whenever the thermal capacity agent melts into liquid form in the compound.

"Directly dispersed" means that no encapsulating structure is used to contain the thermal capacity agent in the thermoplastic elastomer.

Another aspect of the present invention is a thermoplastic elastomer compound having an enthalpy of melting ranging from about 10 to about 120 J/g and an enthalpy of crystallization ranging from about 10 to about 125 J/g.

Another aspect of the present invention is a thermoplastic elastomer compound having a range of transition temperatures between about −10° C. and about 70° C.

Another aspect of the present invention is an article made of the thermoplastic elastomer compounds identified above, in which the article has a latent heat of fusion useful for thermodynamic management of the article.

Features of the invention will become apparent with reference to the following embodiments.

EMBODIMENTS OF THE INVENTION

Styrenic Block Copolymer

Styrenic block copolymers (SBCs) are well known thermoplastic elastomer materials. The elastomeric midblock, flanked by styrenic end blocks, can be isoprene (SIS), isobutylene (SIBS), butylene (SBS), ethylene/butylene (SEBS), ethylene-propylene (SEPS), and ethylene-ethylene/propylene (SEEPS), etc. Any SBC can be a potential candidate for use in the present invention as the thermoplastic elastomer component which can benefit from the addition of thermal capacity agents when making TPE compounds.

Of the possible SBC candidates, SEBS, SEEPS, and SEPS are all suitable for compounding with thermal capacity agents. Therefore, the selection among them depends on the desired physical properties for processing and performance. Of such physical properties, Shore scale hardness, specific gravity, tensile strength, and percentage elongation are all fundamental characterization indicators of suitable processing and performance. Those persons having ordinary skill in the art will recognize the variety of physical properties possible when selecting among these SBC candidate TPEs.

Commercially available TPEs include the Kraton G Series of SEBS (e.g., grades G1650, G1651, G1652 and G1654) sold by Kraton Polymers, the Septon series of SEEPS (e.g., grades 4033, 4044, and 4055) sold by Kuraray America, the Septon series of SEPS (e.g., grades 2004, 2006 and 2007) sold also by Kuraray America, and the Kraton A Series of SEBS (e.g., grades A1535 and A1536) sold also by Kraton Polymers.

Thermal Capacity Agents

Any linear paraffin wax is a candidate for use as a thermal capacity agent in the present invention. Paraffin wax is known to have a thermal capacity of about 200-220 J/g. Used as a functional additive in the TPE in a range of loadings, it has been found that the resulting TPE compound has excellent physical properties (good dispersion of the wax directly in the TPE) and good thermodynamic properties. More specifically, those thermodynamic properties combine a range of useful thermal capacities and a range of useful transition temperatures identified above, permitting the establishment of tailored thermodynamic properties for practically any use for the TPE compound.

Linear paraffin waxes have been investigated to establish those ranges of thermal capacities and ranges of transition temperatures. Unlike the example of water and ice above which involves a solid-liquid transition, the linear paraffin waxes also experience thermodynamically a solid-liquid transition. But because the TPE absorbs the linear paraffin wax even when it is the liquid form, the TPE compound actually experiences a solid to solid phase transition. Significantly and unexpectedly, in spite of direct dispersion of the linear paraffin wax into the TPE, there remain excellent physical properties and no perceived migration or separation of the wax from the TPE during the heating and cooling cycles of testing, whether the linear paraffin wax is liquid or solid directly dispersed in the TPE of the TPE compound.

Without the macrocapsules and microcapsules required by Davis et al., it has been found that linear paraffin waxes directly dispersed as a discontinuous phase in the TPE continuous phase without leaching and while retaining good mechanical properties, even though the linear paraffin wax might be in liquid form. The direct dispersion of the linear paraffin wax in the TPE and its compatibility with that TPE contribute to the stability of the TPE compound to have overall a solid-solid phase transition, even though the linear paraffin wax has melted into liquid form in the TPE compound.

Three different linear paraffin waxes have been identified as of the filing of this patent application which perform well in TPE compounds of this invention. Other candidates with similar properties can also be used. Newly commercialized candidates might also be possible. These three linear paraffin waxes have been found to demonstrate well the range of thermal capacities and the range of transition temperatures identified above, while retaining acceptable mechanical properties.

Low Oil Content Linear Paraffin Wax

One embodiment of thermal capacity agent uses paraffin waxes which have low oil content, less than about 0.5% and preferably less than about 0.3% as measured using ASTM D721.

Of commercially available waxes, Sasolwax brand paraffin waxes are acceptable with grade R4250 being presently preferred. This grade R4250 has a melting temperature ranging about 147-151° F. as measured using ASTM D87 (and preferably 150° F.), a Saybolt color of about +25 minimum measured using ASTM D156 (and preferably +27 minimum), a Needle Penetration at 77° F. of 13 measured using ASTM D1321, a viscosity at 212° F. of about 5.5 centiStokes (cSt) measured using ASTM D445, and a Flash Point, COC of greater than 465° F. measured using ASTM D92. Grade R4250 is compliant with the USA Food and Drug Administration regulations, listed at 21 CFR §172.886 and 21CFR §178.3710. In North America, Sasol Wax is located in Hayward, Calif.

$C_{14}$-$C_{16}$ Linear Paraffin Waxes

A second embodiment of thermal capacity agent uses saturated paraffin wax mixtures which have greater than 95% weight percent hydrogenated linear paraffin molecules of $C_{14}$-$C_{16}$ size.

Of commercially available waxes, Linpar® brand paraffin waxes are acceptable with grade 1416V being presently preferred. This grade 1416V has a CAS No. of 90622-46-1, a Saybolt color of about +30 minimum measured using ASTM D156, a viscosity at 40° C. of about 2.5 centiStokes (cSt) measured using ASTM D445, a Flash Point of greater than 242° F. measured using ASTM D93, a Freeze Point of 45° F. measured using ASTM D2386, a nitrogen content of less than 1 ppm, and a sulfur content of less than 1 ppm. Linpar® brand paraffin waxes are also sold by Sasol Wax.

Single Cut Linear Paraffin Waxes

A third embodiment of thermal capacity agent uses single cut paraffin wax mixtures which have greater than 95% weight percent paraffin molecules of a single carbon chain length.

Of commercially available waxes, Parafol® brand paraffin waxes are acceptable with grade 20Z being presently preferred. This grade 20Z is n-eicosane (also called icosane or didecyl alkane) has a chemical formula of $C_{20}H_{42}$ and a molecular weight of about 282 g/mol. This eicosane has a latent heat of fusion of about 200 measured using DIN 53 765, a Hazen color of about 20 measured using EN ISO 6271-2, a Needle Penetration at 25° C. of about 11 measured using DIN 51 579, an onset temperature of about 32° C. measured using DIN 53 765, viscosity at 40° C. of about 5.7 centiStokes (cSt) measured using ASTM D7042, and a Flash Point of about 176° C. measured using EN ISO 2719. Parafol® brand paraffin waxes are also sold using Sasol Wax.

Plasticizer

A plasticizer can be useful but is preferably not used. For TPE compounds of the present invention, the plasticizer can be mineral oil. As demonstrated below, it has been found that minimizing the amount of plasticizer and maximizing the amount of thermal capacity agents, within acceptable limits to retain physical properties, results in maximizing thermal capacity for both enthalpy of melting and enthalpy of crystallization.

With conventional amounts of plasticizer oil present and thermal capacity agents absent, the TPE compounds exhibited no measurable melting or crystallization. Therefore, conventional TPE compounds lack any measurable thermal capacity. Moving from conventional TPE compounds to TPE compounds of the present invention is, in effect, a replacement of plasticizer oil with linear paraffin waxes as thermal capacity agents, within acceptable ranges and along a continuum within those ranges.

Polyolefins as a Secondary Polymer

In the present invention, the TPE compound includes polyethylene or polypropylene or both to contribute processability to the TPE compound. Of the olefins, high density polyethylene (HDPE) and/or polypropylene (PP) are preferred. Those polyolefins are commercially available from a number of sources.

Other Optional Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-oxidants; anti-static agents; blowing or foaming agents; dispersants; fillers and extenders; fire and flame retardants and smoke suppressants; impact modifiers; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them. Of these optional additives, waxes, phenolic stabilizers, and phosphite antioxidants are often used.

Table 1 shows the acceptable and desirable ranges of ingredients for the TPE compounds of the present invention. The compound can comprise, consist essentially of, or consist of the following ingredients.

TABLE 1

Ranges of Ingredients

| Ingredient (Wt. Percent) | Acceptable | Desirable |
|---|---|---|
| SBC | 25-50 | 35-45 |
| Thermal Capacity Agents | 5-70 | 35-65 |
| Plasticizer | 0-45 | 0-15 |
| Polyolefin | 2-5 | 3-4 |
| Phenolic anti-oxidant | 0-0.2 | 0.1-0.2 |
| Phosphite Stabilizer | 0-0.2 | 0.1-0.2 |
| Other Optional Additives | 0-10 | 1-5 |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition at the head of the extruder. Extruder speeds can range from about 50 to about 500 revolutions per minute (rpm), and preferably from about 300 to about 500 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

TPE compounds of the present invention with good thermal capacity at a variety of transition temperatures, can prove useful in a myriad of ways. The fact that articles of the TPE compound can be tailored to absorb or release a large quantity of heat at a specific temperature allows a person having ordinary skill in the art to engineer TPE compounds to perform thermodynamically using the heating/cooling cycle at a chosen temperature.

As identified above, a TPE compound could be engineered to provide either a heating pad for aching lower back muscles or a cold pack for an injured knee. Beyond consumer goods, one could use TPE compounds for industrial purposes as heat sinks or radiators, again at a chosen transition temperature.

Thermal capacity TPE compounds can be useful in toys and games, insulation, controlled thermodynamic objects, furniture cushions, automobiles, industrial tools, medical devices, mattresses, packaging, consumer products, and other objects benefitting from the amount of thermal capacity at a chosen temperature within a TPE compound have acceptable physical properties and especially a Shore A hardness of less about 85.

EXAMPLES

Table 2 shows the ingredients for Examples 1-15 and Comparative Examples A-G.

All of Examples 1-15 and A-G were made using a twin-screw extruder set at 160° C. for zones 1-3 and 190° C. for all other zones, except for Examples 8-10 which were set at 165° C. in all zones, rotating at 500 rpm. All ingredients were added before Zone 1.

Pellets of all Examples 1-3 and A-B were molded into tensile test bars using a Boy injection molding machine, operating at 190° C. temperature and high pressure.

Conventional physical tests were performed using the ASTM methods listed in Tables 3-6 along with the recipes expressed in weight percent. The Differential Scanning calorimetry tests used ASTM D3418-08, with the rate of heating and cooling shown in each Table. The rate of heating and cooling differed in order to allow enough time for melting and crystallization to complete their transitions before the test finished.

TABLE 2

| Ingredient Name | Purpose | Brand Name | Commercial Source |
|---|---|---|---|
| Styrene ethylene-butylene styrene copolymer (SEBS) | TPE | Kraton G1654 | Kraton Polymers |
| SEBS | TPE | Kraton G1651 | Kraton Polymers |
| SEBS | TPE | Kraton G1650 | Kraton Polymers |
| Styrene ethylene-ethylene-propylene styrene copolymer (SEEPS) | TPE | Septon 4055 | Kuraray America, Inc. |
| Styrene ethylene-propylene styrene copolymer (SEPS) | TPE | Septon 2006 | Kuraray America, Inc. |
| SEBS | TPE | Kraton A1535 | Kraton Polymers |
| Mineral oil | Plasticizer | Puretol PSO 380 | Petro Canada |
| Polypropylene | Thermoplastic | Profax PD 702 | LyondellBasell |
| Hindered phenol type antioxidant | Antioxidant | Irganox 1010 | BASF, formerly Ciba |
| Trisarylphosphite processing stabilizer | Stabilizer | Irgafos 168 | BASF, formerly Ciba |
| Linear paraffin | Thermal capacity agent | Linpar 1416V | Sasol Ltd |
| Linear paraffin | Thermal capacity agent | Parafol 20Z | Sasol Ltd |
| Linear paraffin | Thermal capacity agent | Salsowax R4250 | Sasol Ltd |

TABLE 3

|  | 1 | 2 | 3 | 4 | 5 | 6 | 7 | Comp. A |
|---|---|---|---|---|---|---|---|---|
| Ingredients (Wt. %) | | | | | | | | |
| Kraton G1651 | 38.4 | 45.4 | 45.4 | 45.4 | 45.4 | 45.4 | 45.4 | 45.4 |
| Puretol PSO380 | 0.0 | 0.0 | 4.5 | 13.6 | 25.0 | 36.3 | 45.4 | 49.9 |
| Sasolwax R4250 | 57.6 | 49.9 | 45.4 | 36.3 | 25.0 | 13.6 | 4.5 | 0.0 |
| Profax PD702 | 3.8 | 4.5 | 4.5 | 4.5 | 4.5 | 4.5 | 4.5 | 4.5 |
| Irganox 1010 | 0.1 | 0.1 | 0.1 | 0.1 | 0.1 | 0.1 | 0.1 | 0.1 |
| Irgafos 168 | 0.1 | 0.1 | 0.1 | 0.1 | 0.1 | 0.1 | 0.1 | 0.1 |
|  | 100 | 100 | 100 | 100 | 100 | 100 | 100 | 100 |
| Physical Properties | | | | | | | | |
| Shore A Hardness (ASTM D2240, 10 s delay) | 83 | 83 | 84 | 79 | 62 | 59 | 36 | 33 |
| Specific gravity (ASTM D792) | 0.9 | 0.9 | 0.91 | 0.9 | 0.9 | 0.89 | 0.88 | 0.88 |
| Tensile Strength, psi (ASTM D412, Die C) | 895 | 783 | 672 | 527 | 417 | 376 | 277 | 275 |
| Elongation, % (ASTM D412, Die C) | 759 | 549 | 582 | 682 | 655 | 511 | 463 | 386 |
| DSC Test Results (10° C./min heating and cooling rate) | | | | | | | | |
| Enthalpy of Melting (J/g) | 101 | 94 | 87 | 72 | 52 | 33 | 9 | No melting |
| Enthalpy of Crystallization (J/g) | 102 | 96 | 84 | 72 | 53 | 33 | 9 | No crystallization |
| Crystallization temperature (peak value, ° C.) | 55 | 55 | 52 | 52 | 49 | 48 | 38 | No crystallization |
| Melting temperature (peak value, ° C.) | 65 | 63 | 61 | 60 | 56 | 53 | 43 | No Melting |

TABLE 4

|  | 8 | 9 | 10 | Comp. B |
|---|---|---|---|---|
| Ingredients (Wt. %) | | | | |
| Kraton G1651 | 31.2 | 0.0 | 0.0 | 0.0 |
| Kraton G1650 | 0.0 | 45.4 | 45.4 | 45.4 |
| Puretol PSO380 | 0.0 | 0.0 | 25.0 | 49.9 |
| Parafol 20Z | 62.4 | 49.9 | 25.0 | 0.0 |
| Profax PD702 | 6.2 | 4.5 | 4.5 | 4.5 |
| Irganox 1010 | 0.1 | 0.1 | 0.1 | 0.1 |
| Irgafos 168 | 0.1 | 0.1 | 0.1 | 0.1 |
|  | 100.0 | 100.0 | 100.0 | 100.0 |
| Physical Properties | | | | |
| Shore A Hardness (ASTM D2240, 10 s delay) | 63 | 48 | 24 | 27 |
| Specific gravity (ASTM D792) | 0.89 | 0.88 | 0.85 | 0.87 |
| Tensile Strength, psi (ASTM D412, Die C) | 613 | 396 | 241 | 562 |
| Elongation, % (ASTM D412, Die C) | 869 | 611 | 562 | 746 |
| DSC Test Results (5° C./min heating and cooling rate) | | | | |
| Enthalpy of Melting (J/g) | 120 | 92 | 47 | No melting |
| Enthalpy of Crystallization (J/g) | 125 | 96 | 44 | No Crystallization |
| Crystallization temperature (peak value, ° C.) | 29 | 26 | 19 | No melting |
| Melting temperature (peak value, ° C.) | 34 | 31 | 22 | No Crystallization |

TABLE 5

|  | 11 | 12 | Comp. C |
|---|---|---|---|
| Ingredients (Wt. %) | | | |
| Kraton G1654 | 25.0 | 0.0 | 0.0 |
| Kraton G1650 | 2.8 | 45.4 | 45.4 |
| Puretol PSO380 | 0.0 | 0.0 | 49.9 |
| Linpar 1416V | 69.4 | 49.9 | 0.0 |
| Profax PD702 | 2.8 | 4.5 | 4.5 |
| Irganox 1010 | 0.1 | 0.1 | 0.1 |
| Irgafos 168 | 0.1 | 0.1 | 0.1 |
|  | 100.0 | 100.0 | 100.0 |
| Physical Properties | | | |
| Shore A Hardness (ASTM D2240, 10 s delay) | 45 (Shore 00) | 21 | 27 |
| Specific gravity (ASTM D792) | 0.79 | 0.82 | 0.87 |
| Tensile Strength, psi (ASTM D412, Die C) | 129 | 75 | 562 |
| Elongation, % (ASTM D412, Die C) | 1777 | 220 | 746 |
| DSC Test Results (2.5° C./min heating and cooling rate) | | | |
| Enthalpy of Melting (J/g) | 88 | 47 | No melting |
| Enthalpy of Crystallization (J/g) | 82 | 51 | No Crystallization |
| Crystallization temperature (peak value, ° C.) | −5 | −4 | No melting |
| Melting temperature (peak value, ° C.) | 1 | −3 | No Crystallization |

TABLE 6

|  | 2 (again) | 13 | 14 | 15 | Comp. D | Comp. E | Comp. F | Comp. G |
|---|---|---|---|---|---|---|---|---|
| Ingredients (Wt. %) | | | | | | | | |
| Kraton G1651 | 45.4 | 0.0 | 0.0 | 0.0 | 45.4 | 0.0 | 0.0 | 0.0 |
| Septon 4055 | 0.0 | 45.4 | 0.0 | 0.0 | 0.0 | 45.4 | 0.0 | 0.0 |
| Septon 2006 | 0.0 | 0.0 | 45.4 | 0.0 | 0.0 | 0.0 | 45.4 | 0.0 |
| Kraton A1535 | 0.0 | 0.0 | 0.0 | 45.4 | 0.0 | 0.0 | 0.0 | 45.4 |
| Puretol PSO380 | 0.0 | 0.0 | 0.0 | 0.0 | 49.9 | 49.9 | 49.9 | 49.9 |
| Sasolwax R4250 | 49.9 | 49.9 | 49.9 | 49.9 | 0.0 | 0.0 | 0.0 | 0.0 |
| Profax PD702 | 4.5 | 4.5 | 4.5 | 4.5 | 4.5 | 4.5 | 4.5 | 4.5 |
| Irganox 1010 | 0.1 | 0.1 | 0.1 | 0.1 | 0.1 | 0.1 | 0.1 | 0.1 |
| Irgafos 168 | 0.1 | 0.1 | 0.1 | 0.1 | 0.1 | 0.1 | 0.1 | 0.1 |
|  | 100.0 | 100.0 | 100.0 | 100.0 | 100.0 | 100.0 | 100.0 | 100.0 |
| Physical Properties | | | | | | | | |
| Shore A Hardness (ASTM D2240, 10 s delay) | 83 | 78 | 64 | 76 | 33 | 26 | 27 | 28 |
| Specific gravity (ASTM D792) | 0.9 | 0.91 | 0.91 | 0.93 | 0.88 | 0.88 | 0.88 | 0.9 |
| Tensile Strength, psi (ASTM D412, Die C) | 783 | 792 | 737 | 1195 | 275 | 262 | 250 | 197 |
| Elongation, % (ASTM D412, Die C) | 549 | 822 | 798 | 684 | 386 | 485 | 377 | 352 |
| DSC Test Results (10° C./min heating and cooling rate) | | | | | | | | |
| Enthalpy of Melting (J/g) | 94 | 90 | 91 | 92 | No melting | No melting | No melting | No melting |
| Enthalpy of Crystallization (J/g) | 96 | 88 | 90 | 93 | No Crystallization | No Crystallization | No Crystallization | No Crystallization |

TABLE 6-continued

| | 2 (again) | 13 | 14 | 15 | Comp. D | Comp. E | Comp. F | Comp. G |
|---|---|---|---|---|---|---|---|---|
| Crystallization temperature (peak value, °C.) | 55 | 52 | 59 | 56 | No melting | No melting | No melting | No melting |
| Melting temperature (peak value, °C.) | 63 | 67 | 63 | 66 | No Crystallization | No Crystallization | No Crystallization | No Crystallization |

Table 3 reports the experiments using Sasol R4250 low oil content linear paraffin wax for Examples 1-7 ranging from 57.6 weight percent to 4.5 weight percent as a replacement for plasticizer oil. Comparative Example A had no linear paraffin wax. All of the physical properties of Examples 1-7 were acceptable for a TPE compound. The DSC test results demonstrated that enthalpy of melting and enthalpy of crystallization can be engineered to range from a high of about 101 J/g to a low of 9 J/g, indicating that the gradation of thermal capacity is a function of the amount of low oil content linear paraffin wax present. Moreover, the transition temperatures for Examples 1-7 during the heating/cooling cycle were all above human body temperature, whereas Comparative Example A had no measurable melting or crystallization whatsoever. TPE compounds of Examples 1-7 would be excellent heating pads or other similar articles needing thermal capacity above human body temperature.

Table 4 reports the experiments using Parafol 20Z eicosane linear paraffin wax for Examples 8-10 ranging from 62.4 weight percent to 25 weight percent as a replacement for plasticizer oil. Comparative Example B had no linear paraffin wax. All of the physical properties of Examples 8-10 were acceptable for a TPE compound. The DSC test results demonstrated that enthalpy of melting and enthalpy of crystallization can be engineered to range from a high of about 125 J/g to a low of 44 J/g, indicating also that the gradation of thermal capacity is a function of the amount of eicosane linear paraffin wax present. Moreover, the transition temperatures for Examples 8-10 during the heating/cooling cycle were at or near a range of temperate outdoor temperatures to ambient air conditioned indoor temperatures, whereas Comparative Example B had no measurable melting or crystallization whatsoever. A direct comparison exists between Example 9 and Comparative Example B. Replacement of plasticizer oil with eicosane linear paraffin wax maintained physical properties of the TPE compound while also establishing nearly 100 J/g of thermal capacity and a transition temperature of a pleasant Spring day in a temperature climate. TPE compounds of Examples 8-10 would be excellent materials for applications which need to maintain a temperature close to human body temperature for as long as possible, such as textiles for sportswear, or other similar articles needing thermal capacity at a temperature experienced in most air conditioned interior environments.

Table 5 reports the experiments using Linpar 1416V hydrogenated $C_{14}$-$C_{16}$ mixture of linear paraffin waxes for Examples 11 and 12 ranging from 69.4 weight percent to 49.9 weight percent as a replacement for plasticizer oil. Comparative Example C had no linear paraffin wax. All of the physical properties of Examples 11 and 12 were acceptable for a TPE compound. The DSC test results demonstrated that enthalpy of melting and enthalpy of crystallization can be engineered to range from a high of about 88 J/g to a low of 47 J/g, indicating also that the gradation of thermal capacity is a function of the amount of $C_{14}$-$C_{16}$ linear paraffin wax present. Moreover, the transition temperatures for Examples 11 and 12 during the heating/cooling cycle were at or below the freezing point of water, whereas Comparative Example C had no measurable melting or crystallization whatsoever. Example 11 demonstrated that more than one TPE could be used in the compound and achieve acceptable results. TPE compounds of Examples 11 and 12 would be excellent cold packs or other similar articles needing thermal capacity at a temperature experienced in frigid exterior environments.

Table 6 reports the experiments using Sasol R4250 low oil content linear paraffin wax for Examples 13-15 (with Example 2 reported again for ease of comparison) at a constant of 49.9 weight percent with a variety of TPEs at a constant of 45.5 weight percent. The linear paraffin wax in Examples 2 and 13-15 was a direct replacement for the plasticizer oil of Comparative Examples D-G, respectively. All of the physical properties of Examples 2 and 13-15 were acceptable for a TPE compound. The DSC test results demonstrated that enthalpy of melting and enthalpy of crystallization are indications of excellent thermal capacity and all quite similar as one moves from one type of TPE to another. Likewise, the transition temperatures were also very similar and in a range higher than human body temperature. None of Comparative Examples D-G had any measurable melting or crystallization whatsoever. TPE compounds of Examples 2 and 13-15 would be excellent heating pads or other similar articles needing thermal capacity above human body temperature.

This invention is not limited to the above embodiments. The claims follow.

What is claimed is:

1. A thermoplastic elastomer compound, comprising:
   (a) at least one thermoplastic elastomer, wherein the thermoplastic elastomer is a styrenic block copolymer,
   (b) at least one thermal capacity agent selected from the group consisting of low oil content linear paraffin waxes, $C_{14}$-$C_{16}$ linear paraffin waxes, single cut linear paraffin waxes, and combinations thereof, and directly dispersed in the compound from about 5 to about 70 weight percent of the compound,
   (c) plasticizer from 0 to about 45 weight percent of the compound, and
   (d) one or more additives from 0 to about 10 weight percent of the compound, wherein the one or more additives are selected from the group consisting of adhesion promoters; biocides; anti-fogging agents; anti-oxidants; anti-static agents; blowing agents; dispersants; extenders; fillers; flame retardants; foaming agents; smoke suppressants; impact modifiers; initiators; lubricants; micas; pigments; colorants; dyes; processing aids; release agents; silanes; titanates; zirconates; slip agents; anti-blocking agents; stabilizers; stearates; ultraviolet light absorbers; viscosity regulators; waxes; and combinations of them, wherein the compound has an enthalpy of melting ranging from about 10 to about 120 J/g and an enthalpy of crystallization ranging from about 10 to about 125 J/g, and wherein the compound experiences a solid-solid phase transition whenever the thermal capacity agent melts into liquid form in the compound.

2. The compound of claim 1, wherein the styrenic block copolymer is selected from the group consisting of styrene ethylene-butylene styrene copolymer, styrene ethylene-ethylene-propylene styrene copolymer, styrene ethylene-propylene styrene copolymer, and combinations thereof.

3. The compound of claim 1, wherein the compound further comprises polyolefin.

4. The compound of claim 1, wherein the compound has a range of transition temperatures between about −10° C. and about 70° C.

5. An article of the compound of claim 1.

6. The compound of claim 1, wherein the compound comprises no plasticizer.

7. The compound of claim 6, wherein the compound has a Shore A hardness of less than about 85.

8. The compound of claim 1, wherein the compound comprises no filler.

9. A thermoplastic elastomer compound, comprising:
 (a) at least one thermoplastic elastomer, wherein the thermoplastic elastomer is a styrenic block copolymer,
 (b) at least one thermal capacity agent selected from the group consisting of low oil content linear paraffin waxes, $C_{14}$-$C_{16}$ linear paraffin waxes, single cut linear paraffin waxes, and combinations thereof, and directly dispersed in the compound from about 5 to about 70 weight percent of the compound, and
 (c) filler from 0 to about 10 weight percent of the compound, wherein the compound experiences a solid-solid phase transition whenever the thermal capacity agent melts into liquid form in the compound.

10. The compound of claim 9, wherein the compound comprises no filler.

* * * * *